United States Patent
Herzog et al.

(10) Patent No.: US 11,362,503 B2
(45) Date of Patent: Jun. 14, 2022

(54) METHOD AND DEVICE FOR COOLING A SUPERCONDUCTING CURRENT CARRIER

(71) Applicants: Messer SE & Co. KGaA, Bad Soden (DE); MESSER INDUSTRIEGASE GMBH, Bad Soden (DE)

(72) Inventors: Friedhelm Herzog, Krefeld (DE); Thomas Kutz, Brüggen-Born (DE)

(73) Assignees: Messer SE & Co. KGaA, Bad Soden (DE); Messer Industriegase GmbH, Bad Soden (DE)

( * ) Notice: Subject to any disclaimer, the term of this patent is extended or adjusted under 35 U.S.C. 154(b) by 0 days.

(21) Appl. No.: 16/965,877

(22) PCT Filed: Dec. 20, 2018

(86) PCT No.: PCT/EP2018/086290
§ 371 (c)(1),
(2) Date: Aug. 5, 2020

(87) PCT Pub. No.: WO2019/154552
PCT Pub. Date: Aug. 15, 2019

(65) Prior Publication Data
US 2021/0044099 A1    Feb. 11, 2021

(30) Foreign Application Priority Data
Feb. 8, 2018   (DE) .......................... 102018001040.7

(51) Int. Cl.
  *F25D 3/10*      (2006.01)
  *H02G 15/34*   (2006.01)

(52) U.S. Cl.
  CPC ............... *H02G 15/34* (2013.01); *F25D 3/10* (2013.01)

(58) Field of Classification Search
  CPC ............ F25D 3/10; H02G 15/34; Y02E 40/60
  (Continued)

(56) References Cited

U.S. PATENT DOCUMENTS 6,609,383 B1 * 8/2003 Kusada ..................... F25B 9/10
                                                                  62/51.2
6,732,536 B1 * 5/2004 Bonaquist ............. F25B 19/005
                                                                  62/50.5
(Continued)

FOREIGN PATENT DOCUMENTS

| EP | 1850354 B1 | 6/2012 |
| WO | WO 2007005091 A1 | 1/2007 |

OTHER PUBLICATIONS

International Search Report and Written Opinion issued in corresponding PCT Application No. PCT/EP2018/086290, dated Mar. 26, 2019.

*Primary Examiner* — Timothy J Thompson
*Assistant Examiner* — Guillermo J Egoavil
(74) *Attorney, Agent, or Firm* — Andrus Intellectual Property Law, LLP

(57) ABSTRACT

For the transmission of electrical current, determined superconducting current carriers are accommodated in a cryostat, in which they are cooled with an undercooled cryogenic cooling medium, e.g. liquid nitrogen. The current carrier is electrically connected at the ends thereof to two normally conducting current supply means. The cooling medium is undercooled from a storage container to a temperature below its boiling temperature and supplied to the cryostat via a cooling medium inlet, brought into thermal contact with the superconducting current carrier, and subsequently discharged via a cooling medium outlet of the cryostat. According to the invention, the cooling medium from the cryostat is to be used for cooling at least one of the normally conducting current supply means.

20 Claims, 1 Drawing Sheet

(58) Field of Classification Search
USPC ......... 174/15.5; 62/50.1, 513, 467; 165/157, 165/61
See application file for complete search history.

(56) References Cited

U.S. PATENT DOCUMENTS

| | | |
|---|---|---|
| 2006/0150639 A1 | 7/2006 | Zia et al. |
| 2013/0067952 A1* | 3/2013 | Ri .......................... F25B 29/00 165/157 |
| 2014/0150471 A1* | 6/2014 | Schippl .................. H01B 12/16 62/50.1 |

* cited by examiner

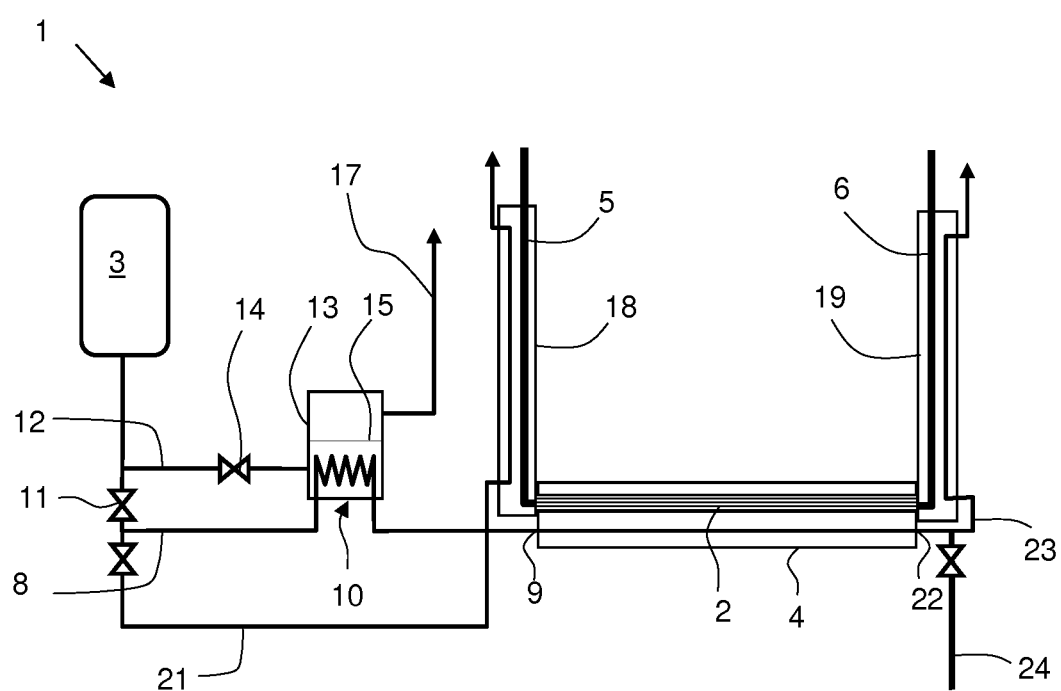

METHOD AND DEVICE FOR COOLING A SUPERCONDUCTING CURRENT CARRIER

CROSS-REFERENCE TO RELATED APPLICATIONS

This application is the U.S. national stage application of International Application No. PCT/EP2018/086290, filed Dec. 20, 2018, which International Application was published on Aug. 15, 2019, as International Publication WO 2019/154552 in the German language. The International Application claims priority to German Application No. 102018001040.7, filed Feb. 8, 2018. The International Application and German Application are hereby incorporated herein by reference, in their entireties.

FIELD

The invention relates to a method for cooling a superconducting current carrier which is accommodated in a cryostat and is electrically connected to two normally conducting power leads, in which a cooling medium from a stock vessel is supercooled to a temperature below its boiling point and fed via a cooling medium inlet into the cryostat, brought into thermal contact with the superconducting current carrier and subsequently discharged via a cooling medium outlet from the cryostat.

BACKGROUND

In the following, the term superconducting current carrier is used to refer to components intended for transport of electric power; in particular, they are superconducting cables or superconducting power rails. Like all devices operating on the basis of superconducting components, such superconducting current carriers have to be cooled to an operating temperature which is below the superconducting transition temperature (critical temperature) of the superconductor used. Critical temperatures of superconductors vary within a wide range and range from Tc<10 K in the case of classical metallic superconductors to values of Tc>100 K in the case of ceramic high-temperature superconductors, for example $Bi_2Sr_2Ca_nCu_{n+1}O_{2a}+6$. In the prior art, supercooled liquified gases, for example cryogenic liquified nitrogen, liquid air or a liquified noble gas, in particular liquid helium, are used as heat transfer medium for cooling. For the present purposes, a "supercooled liquified gas" is a gas which is present at a temperature below the boiling point at the respective prevailing pressure. In contrast to the use of a liquified gas which has not been supercooled, i.e. a liquified gas present at the respective boiling point, the absorption of heat firstly brings about only a temperature increase in the liquified gas without a change of state occurring.

Examples of such cooling systems are described in the documents U.S. Pat. No. 6,732,536 B 1, WO 2007/005091 A1, EP 1 850 354 A1 and US 2006/0150639 A1. In all these systems, the liquified gas is supercooled and fed by means of a pump to the object (superconducting current carrier). After heat exchange with the object, the cooling medium is again cooled by means of a supercooler in order to remove the heat absorbed on thermal contact with the object and is then available again for renewed cooling of the object. As supercooler, use is made of, for example, a refrigeration machine or, as in the subject matter of EP 1 850 354 A1 and U.S. Pat. No. 6,732,536 B1, a heat exchanger in which a cooling medium vaporizes on the heat-removing side at a temperature which is below the cooling temperature of the object to be cooled. For example, the same cooling medium as in the refrigeration circuit is vaporized at a pressure which is lower than the system pressure in the refrigeration circuit and is brought into thermal contact with the cooling medium which is present at a higher pressure. In this way, the cooling medium present at the higher pressure is supercooled. The vaporization pressure and thus the vaporization temperature of the medium used for supercooling can be decreased even further by use of vacuum pumps. The choice of the cooling medium depends on the operating temperature of the object to be cooled; in the case of systems which operate on the basis of high-temperature superconductors, liquid nitrogen is frequently employed as cooling medium.

The known systems have disadvantages which become apparent especially in the case of long cooling distances, particularly in the cooling of long superconducting cables or power rails. Since the cooling medium is circulated, the cooling medium goes, according to the prior art, either through the superconducting current carrier both on the way out and the way back or the cooling medium is recirculated through a return conduit running parallel to the current carrier back to the cooling medium tank or to the suction side of the pump. In the first case, the presence of two flow paths complicates the structure of the superconducting current carrier and the pressure drop occurring over twice the length of the cooling path has to be compensated for by correspondingly complicated pump and pressure conduit systems. In the second case, construction of a complicated, thermally insulated return conduit is necessary. Particularly in the case of superconducting cables or power rails, there is the additional problem that the objects to be cooled have a length of from a few hundred meters to a few kilometers, with the development of even considerably longer current carriers being expected in the future. In order to keep the losses which occur as small as possible, the current carrier is therefore divided into cooling segments which are fluidically separated from one another and for each of which an intrinsic circuit cooling system is used. However, this is accompanied by a high outlay in terms of apparatus.

To be able to conduct current through a superconducting current carrier, the superconducting current carrier is electrically connected at both ends to normally conducting power leads which serve to conduct the current from a generator and further to a load. Since high currents of, for example, up to 200 000 A, which lead to considerable evolution of heat in the normally conducting power leads, are conducted through the power leads and the superconducting current carrier during operation and at the same time the superconducting current carrier always has to be kept at a temperature below its critical temperature during operation, cooling of the power leads is indispensable, in particular in the transition region to the superconducting current carrier. At present, cooling of the power leads is carried out using conventional cooling machines which are, however, technically complicated and in turn have a high power consumption.

SUMMARY

It is accordingly an object of the present invention to provide a possible way of cooling superconducting current carriers which for a similar power capability make do with a lower outlay in terms of apparatus than systems known from the prior art.

This object is achieved by a method having the features of patent claim 1 and by an apparatus having the features of patent claim 9. Advantageous embodiments may be derived from the combinations of features in the dependent claims.

According to the invention, a method of the abovementioned type and purpose indicated above is thus characterized in that the cooling medium which has passed through the cryostat is brought into thermal contact with at least one first power lead.

In the method according to the invention, the cold content of the cooling medium is thus utilized a number of times: firstly to keep the superconducting current carrier at a temperature below its critical temperature and secondly to cool the normally conducting power lead. Since the superconducting current carrier does not generate any heat during operation, there is only a slight heat input via the insulation of the cryostat. For this reason, the cooling medium upstream of the cryostat is preferably supercooled to such an extent that it is still present as liquified gas when it leaves the cryostat and is supplied to the normally conducting power lead.

The liquified gas used as cooling medium is supercooled, i.e. brought to a temperature below its boiling point, before being brought into thermal contact with the object. For this purpose, the cooling medium conduit is equipped with a device for supercooling the cooling medium conveyed through the cooling medium conduit. This ensures that the cooling medium is always present as supercooled liquified gas before thermal contact with the superconducting current carrier. To supercool the cooling medium, use is made of, for example, an apparatus in which a liquified, cryogenic cooling medium present at a given pressure, for example liquid nitrogen, is brought into thermal contact with the same cooling medium which is likewise in the liquified state but is present at a lower pressure. Since the boiling point decreases with decreasing pressure, the cooling medium present at the higher pressure is cooled by the thermal contact to a temperature below its boiling point. In this way, the cryogenic cooling medium can be cooled to a temperature which is, for example, from 5 to 10 K below or even further below its boiling point. However, a refrigeration machine or a heat exchanger which establishes thermal contact with a further, even colder medium can also be used as an alternative.

If the cold content of the cooling medium conveyed through the cryostat is insufficient for cooling the power lead, one embodiment of the invention provides for additional cooling medium from the stock vessel or a further stock vessel to be added thereto downstream of the cryostat and be used for cooling the power lead.

In a particularly advantageous embodiment of the invention, cooling medium from the stock vessel is used for cooling the second power lead. The second power lead can also be cooled by means of cooling medium from the cryostat, which represents a preferred embodiment, especially in the case of short current carrier arrangements. However, particularly in the case of relatively long current carriers, it is advisable to connect the second power lead to a separate cooling medium conduit on the stock vessel in order to limit the outlay in terms of apparatus.

The supercooling of the cooling medium is preferably carried out by bringing cooling medium from the stock vessel into indirect thermal contact in a vessel with a cooling medium which is present at a pressure lower than the pressure in the stock vessel. The gas which vaporizes from the vessel or is taken off by means of a vacuum pump still has a considerable cold content and can likewise be used advantageously for cooling a power lead or both power leads.

In an alternative possible way of supercooling the cooling medium, condensed cooling medium whose pressure immediately before the stock vessel is filled is lower than the pressure, determined by the tank pressure and also by the hydrostatic pressure of the cooling medium already present in the stock vessel, at the bottom of the stock vessel is fed continuously or at regular intervals into the stock vessel. The cooling medium which is taken off at the bottom of the stock vessel and used for cooling the power leads is as a result at a temperature significantly below the boiling point at the pressure at the bottom of the stock vessel.

Still another possible way of supercooling the cooling medium is characterized in that a first cooling medium and, for supercooling the first cooling medium, a second cooling medium which is present at a lower temperature and is in direct or indirect thermal contact with the first cooling medium at a heat exchanger is used as cooling medium. For example, liquid oxygen is used as first cooling medium and liquid nitrogen which owing to its lower boiling point supercools the liquid oxygen is used as second cooling medium.

Preference is given to using a liquified gas, for example liquid nitrogen, liquid oxygen, LNG or a liquified noble gas, in particular liquid argon or liquid helium, as cooling medium. Liquid nitrogen is particularly suitable for cooling apparatuses which operate on the basis of high-temperature superconductors, in particular cooling of superconducting current carriers or segments of superconducting current carriers. When liquid oxygen is used, this can be passed to a further use, for example as oxidant in a combustion process, after cooling the current carrier.

In yet another advantageous embodiment of the method according to the invention, the amount of the refrigeration medium supplied to the power leads is regulated as a function of the refrigerating power required.

An apparatus suitable for cooling a superconducting current carrier and carrying out the method according to the invention comprises the features of patent claim 9. The apparatus according to the invention comprises a superconducting current carrier which is electrically connected at its ends with in each case a normally conducting power lead and is accommodated in a cryostat having a cooling medium inlet and a cooling medium outlet, where the cooling medium inlet is fluidically connected via a feed conduit to a stock vessel for a cryogenic cooling medium, which feed conduit is assigned a device for supercooling. For example, a device for supercooling the cooling medium is arranged in the feed conduit. The apparatus is, according to the invention, characterized in that the power leads are, at least at their sections adjoining the superconducting current carrier, passed through heat exchangers which each have a cooling medium inlet and a cooling medium outlet and the cooling medium inlet of at least one of the heat exchangers is fluidically connected to the cooling medium outlet of the cryostat.

In the apparatus according to the invention, a cryogenic cooling medium is thus firstly supercooled and used for cooling the superconducting current carrier in the cryostat and subsequently used in a heat exchanger for cooling at least one of the power leads. As a result of this construction, complicated electrically operated cooling machines for cooling the power lead are avoided or can at least be designed with a lower power. Instead of an electrically operated cooling machine which may additionally be necessary, cryogenic cooling medium which is used in addition to the cooling medium conveyed through the cryostat for cooling the power lead can also be employed. For this purpose, a feed conduit from which cooling medium from the stock vessel and/or a further stock vessel can be mixed opens into a conduit connecting the cooling medium outlet of the cryostat to the cooling medium inlet of the heat exchanger of the conduit connecting the power lead. Otherwise, a supercooler can also be provided in said feed conduit and the cooling medium can be mixed as supercooled liquified gas into that discharged from the cryostat.

The supercooler can also be arranged as a separate apparatus between stock vessel and current carrier. However, in order to avoid introduction of heat into the supercooler, it is also possible to arrange a section of the feed conduit with the supercooler within the stock vessel. Likewise, the stock vessel itself can be employed as supercooler by bringing the liquid gas kept in stock in the stock vessel into a supercooled state by thermal contact with a colder medium.

BRIEF DESCRIPTION OF THE DRAWING

An exemplary embodiment of the invention will be illustrated in more detail below with the aid of the drawing. The single drawing (FIG. 1) schematically shows an apparatus for carrying out the method according to the invention.

DETAILED DESCRIPTION

The apparatus 1 for cooling a superconducting current carrier 2 which is shown in FIG. 1 comprises a stock vessel 3 for storing a cryogenic cooling medium, for example a storage tank having walls which are well insulated thermally. The cooling medium is, for example, liquified nitrogen, liquified oxygen or a liquified noble gas. The superconducting current carrier 2 is a conductor which is made of a superconducting material, in the exemplary embodiment from a high-temperature superconducting material. In particular, it is a superconducting cable or a superconducting power rail. In order to keep the superconducting current carrier 2 at a temperature below the superconducting critical temperature of its material during use, the current carrier 2 is accommodated over its entire length in a cryostat 4 in which the superconducting current carrier 2 is brought into contact with cooling medium from the stock vessel 3. The superconducting current carrier 2 is electrically connected to normally conducting power leads 5, 6, for example current carriers or solid leads made of a material with good conductivity such as copper, for example.

A cooling medium conduit 8 which is fluidically connected to a cooling medium inlet 9 of the cryostat 4 serves for transporting the cooling medium from the stock vessel 3 to the cryostat 4. A device 10 for supercooling the liquified gas conveyed through the cooling medium conduit 8 is provided in the cooling medium conduit 8. The passage of liquified gas through the cooling medium conduit 8 can be interrupted or opened by means of a shutoff valve 11.

The device 10 is, in particular, a supercooler which operates according to the following principle: an outlet conduit 12 through which cooling medium is discharged from the stock vessel 3 and is brought into thermal contact in a vessel 13 installed in the device 10 with the medium conveyed through the cooling medium conduit 8 branches off from the cooling medium conduit 8. By means of a shutoff valve 14, the medium in the vessel 13 can be fluidically separated from the cooling medium conveyed through the cooling medium conduit 8. In the vessel, cooling medium is introduced to the height of a level 15. An outlet conduit 17 for gaseous cooling medium branches off from the gas phase above the level 15 and is connected either to the surrounding atmosphere or to a vacuum pump which is not shown here. Since the cooling medium brought in via the cooling medium conduit 8 is at a higher pressure and thus at a higher temperature than the cooling medium in the vessel 13 on entering the heat exchanger 10, the medium conveyed through the cooling medium conduit 8 is brought by heat exchange to a temperature below its boiling point, i.e. supercooled. For example, the cooling medium subsequently fed to the cooling medium inlet 9 is cooled to a temperature which is from 5 K to 10 K or more below its boiling point. In order to be able to set the temperature of the cooling medium in a wide range, it is also advantageous to connect a vacuum pump, which is not shown here, to the outlet conduit 17 so that the pressure of the cooling medium in the outlet conduit 17, and thus the temperature thereof in the vessel 13, can be reduced further by means of said vacuum pump.

When the apparatus 1 is operated, the superconducting current carrier 2 is cooled to a temperature below its superconducting critical temperature. An electric current, preferably direct current having a current intensity of, for example, 200 000 A, is subsequently passed from a current generator which is not shown here via the power lead 5 into the superconducting current carrier 2 and to the power lead 6 and subsequently conducted to a load which is likewise not shown here.

Since there is considerable evolution of heat because of the high currents in the normally conducting power leads 5, 6, the latter are each equipped with a heat exchanger 18, 19 for thermal contact with a cooling medium. Cooling medium from the stock vessel 3 is used as cooling medium in the apparatus 1. While the cooling medium for the heat exchanger 18 is conveyed via a feed conduit 21 directly from the stock vessel 3 into the heat exchanger and comes into thermal contact there with the power lead 5 on a heat exchanger surface which is not shown here, the heat exchanger 19 is cooled by the cooling medium which exits from the cryostat 4 at a cooling medium outlet 22 and is conveyed via a conduit 23 to the heat exchanger 19. Since the cooling medium in the cryostat 4 takes up only a small amount of heat, predominantly because of heat input via the insulating walls of the cryostat 4, during operation of the superconducting current carrier 2, the cooling medium is still in the liquid state even in the conduit 23. The cryogenic refrigeration medium vaporizes at least partly as a result of thermal contact with the power leads 5, 6 and after passing through the heat exchangers is released into the surrounding atmosphere or passed to a further use.

Furthermore, cold gas from the outlet conduit 17 can also be used for cooling in one of the heat exchangers 18, 19, instead of or in addition to the cooling medium brought in via the conduits 21, 23. In addition, if the superconducting current carriers 2 are not excessively long, the cooling medium exiting from the cryostat 4 at the cooling medium outlet can be used for cooling both power leads 5, 6. The conduit 23 can also be equipped with a feed conduit 24 through which additional cooling medium can be supplied when required from the stock vessel 3 or a further stock vessel and used for cooling the power lead 6 in the heat exchanger 19.

The apparatus 1 according to the invention is particularly suitable for cooling long superconducting current carriers 2, in the case of which circulation of the cooling medium would be uneconomical because of the high outlay in terms of apparatus and/or the unavoidable heat input through the insulating walls of the cryostat 4.

LIST OF REFERENCE NUMERALS

1. Apparatus
2. Superconducting current carrier
3. Stock vessel
4. Cryostat
5. Power lead
6. Power lead
7. -
8. Cooling medium conduit
9. Cooling medium inlet
10. Device for supercooling
11. Shutoff valve
12. Outlet conduit
13. Vessel
14. Shutoff valve
15. Level
16. -
17. Outlet conduit
18. Heat exchanger
19. Heat exchanger
20. -
21. Feed conduit
22. Cooling medium outlet
23. Conduit
24. Feed conduit

The invention claimed is:

1. A method for cooling a superconducting current carrier which is accommodated in a cryostat and is electrically connected to two normally conducting power leads, in which a cooling medium from a stock vessel is supercooled to a temperature below its boiling point and fed via a cooling medium inlet into the cryostat, brought into thermal contact with the superconducting current carrier and subsequently discharged via a cooling medium outlet from the cryostat, wherein the cooling medium which has passed through the cryostat is brought into thermal contact with a first one of the power leads in a heat exchanger configured to cool the first one of the power leads.

2. The method as claimed in claim 1, wherein the cooling medium supplied to the first one of the power leads is supplemented downstream of the cryostat with cooling medium from the stock vessel or a further stock vessel.

3. The method as claimed in claim 1, wherein cooling medium from the stock vessel is used for cooling a second one of the power leads.

4. The method as claimed in claim 1, wherein in order to supercool the cooling medium, cooling medium from the stock vessel is brought into indirect thermal contact in a vessel with a cooling medium which is present at a pressure lower than the pressure in the stock vessel and cooling medium vaporizing from the vessel is used for cooling at least one of the power leads.

5. The method as claimed in claim 1, wherein in order to supercool the cooling medium, condensed cooling medium whose pressure immediately before the stock vessel is filled is lower than the pressure at the bottom of the stock vessel is fed continuously or at regular intervals into the stock vessel.

6. The method as claimed in claim 1, wherein a first cooling medium and, for supercooling the first cooling medium, a second cooling medium which is present at a lower temperature and is in thermal contact with the first cooling medium is used as the cooling medium.

7. The method as claimed in claim 6, wherein a liquified gas is used as the first cooling medium and/or the second cooling medium.

8. The method as claimed in claim 1, wherein the amount of cooling medium supplied to the first one of the power leads is regulated as a function of the refrigerating power required.

9. An apparatus for carrying out the method as claimed in claim 1, comprising a superconducting current carrier which is electrically connected at its ends with in each case a normally conducting power lead and is accommodated in a cryostat having a cooling medium inlet and a cooling medium outlet, where the cooling medium inlet is fluidically connected via a feed conduit to a stock vessel for a cryogenic cooling medium, which feed conduit is assigned a device for supercooling the cooling medium, wherein the power leads are, at least at their sections adjoining the superconducting current carrier, passed through heat exchangers which are configured to cool the power leads and each have a cooling medium inlet and a cooling medium outlet and the cooling medium inlet of at least one of the heat exchangers is fluidically connected to the cooling medium outlet of the cryostat.

10. The method as claimed in claim 1, wherein the cooling medium which has passed through the cryostat is in a supercooled liquid state when brought into thermal contact with the first one of the power leads.

11. A method for cooling a superconducting current carrier that is in a cryostat and electrically connected to two normally conducting power leads, the method comprising steps for:
    transporting a cooling medium from a storage tank to a cooling vessel;
    supercooling the cooling medium to a temperature below its boiling point in the cooling vessel;
    feeding the cooling medium into the cryostat via a cooling medium inlet;
    bringing the cooling medium into thermal contact with the superconducting current carrier;
    discharging the cooling medium from the cryostat via a cooling medium outlet; and
    bringing the cooling medium discharged from the cryostat into thermal contact with at least one of the power leads in a heat exchanger configured to cool the at least one of the power leads.

12. The method of claim 11, wherein supercooling the cooling medium comprises:
    supplying low pressure cooling medium to the cooling vessel;
    bringing the cooling medium into indirect thermal contact with the low pressure cooling medium; and
    vaporizing the low pressure cooling medium in the cooling vessel.

13. The method of claim 12, wherein the low pressure cooling medium is additional cooling medium supplied from the storage tank.

14. The method of claim 12, further comprising supplying the vaporized low pressure cooling medium from the cooling vessel to at least one of the power leads.

15. The method of claim 11, wherein the cooling medium is brought into thermal contact with both of the power leads.

16. The method of claim 11, further comprising bringing supplemental cooling medium into thermal contact with at least one of the power leads, wherein the supplemental cooling medium is not fed into the cryostat.

17. The method of claim 16, wherein the supplemental cooling medium is additional cooling medium supplied from the storage tank.

18. The method of claim 11, further comprising feeding, at regular intervals, condensed cooling medium into the storage tank;
   wherein the pressure of the condensed cooling medium is lower than the pressure in the storage tank.

19. The method of claim 11, further comprising vaporizing the cooling medium that is in thermal contact with the at least one of the power leads.

20. A method for cooling a superconducting current carrier which is accommodated in a cryostat and is electrically connected to two normally conducting power leads, in which a cooling medium from a stock vessel is supercooled to a temperature below its boiling point and fed via a cooling medium inlet into the cryostat, brought into thermal contact with the superconducting current carrier and subsequently discharged via a cooling medium outlet from the cryostat, wherein the cooling medium which has passed through the cryostat is brought into thermal contact with at least one first power lead;
   wherein in order to supercool the cooling medium, cooling medium from the stock vessel is brought into indirect thermal contact in a vessel with a cooling medium which is present at a pressure lower than the pressure in the stock vessel and cooling medium vaporizing from the vessel is used for cooling at least one of the power leads.

\* \* \* \* \*